Jan. 10, 1939.     D. R. HILLIS     2,143,733
REVERSIBLE SINGLE-LINE FEEDER
Filed Oct. 17, 1936
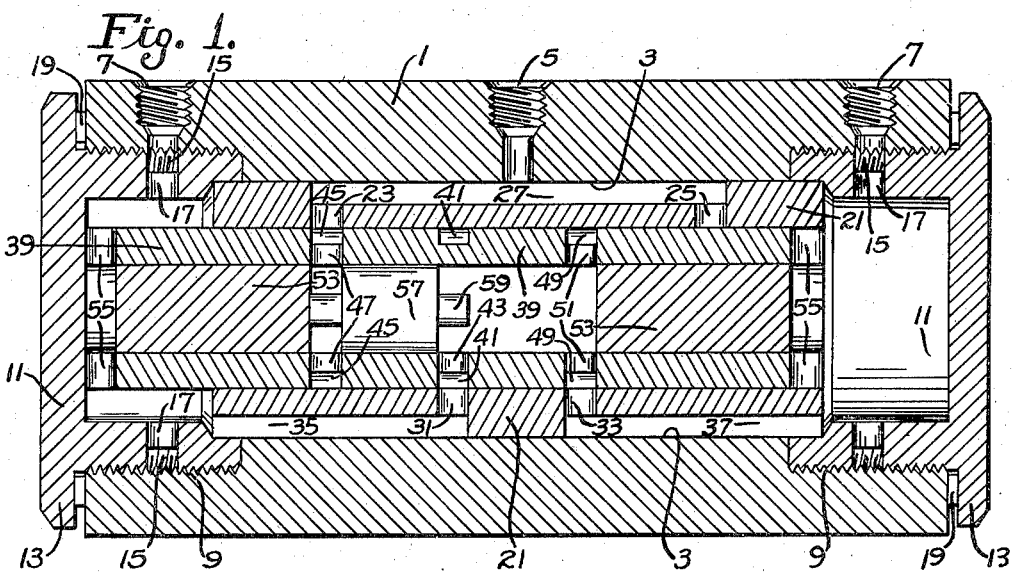
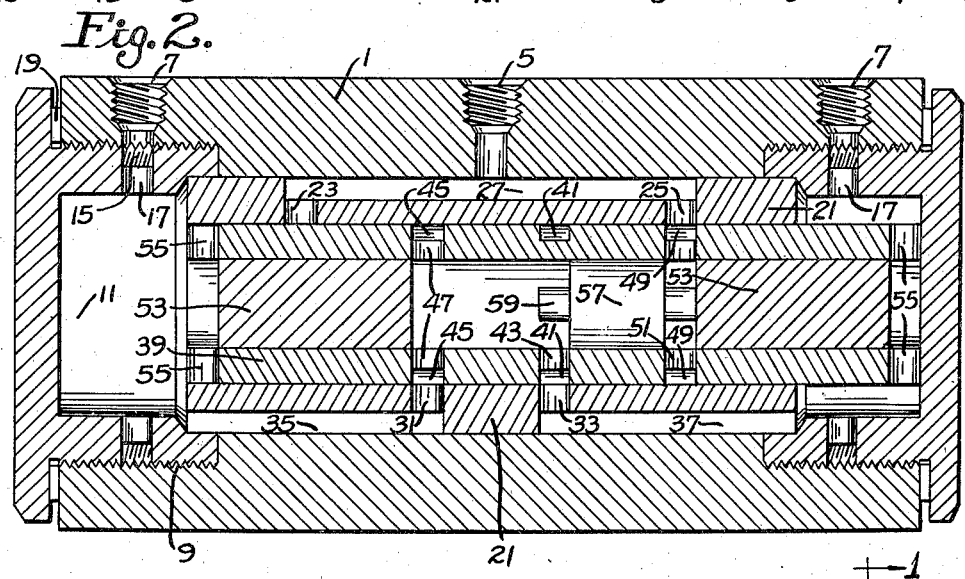
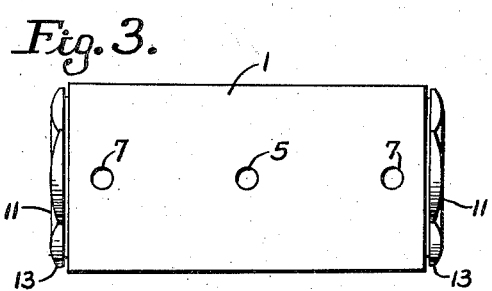
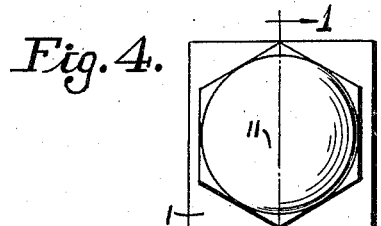
INVENTOR
David R. Hillis
BY
ATTORNEY Patented Jan. 10, 1939

2,143,733

UNITED STATES PATENT OFFICE 2,143,733

REVERSIBLE SINGLE-LINE FEEDER

David R. Hillis, Detroit, Mich., assignor to Trabon Engineering Corporation, Cleveland, Ohio, a corporation of Ohio Application October 17, 1936, Serial No. 106,185

3 Claims. (Cl. 184—7)

My invention pertains to distributing feeders for lubricants and other fluids and more particularly to feeders for fluid distributing systems of the single-line flow reversing type as disclosed in my copending applications Serial No. 523,149 filed: March 16, 1931 and Serial No. 738,656 filed: August 6, 1934.

Many feeders for this type of service, which I have developed, are disclosed in my Patent No. 1,997,406 and in several of my copending patent applications. However, such prior feeders with which I am familiar comprise many moving parts which must be of accurate and precise construction for fitting together very closely without binding. Furthermore, such prior constructions involve the necessity of providing the feeder body with a plurality of smooth accurate bores which greatly adds to the difficulty of making and servicing these devices.

It is accordingly an object of my invention to provide a fluid distributing feeder of an improved construction to eliminate the difficulties of construction and service previously caused by the many moving parts closely fitted into a plurality of accurate bores in the feeder body.

It is a further object of my invention to provide a simplified fluid distributing feeder of improved construction comprising elements which may be readily provided from tubular members and which are conveniently assembled.

The invention itself, however, both as to its construction and its operation, together with additional objects and advantages thereof, will best be understood from the following description of a specific embodiment, when read in conjunction with the accompanying drawing, where like reference characters designate similar parts throughout, and in which:

Fig. 1 is a longitudinal sectional view, on line I—I of Fig. 4, showing a fluid distributing feeder constructed in accordance with my invention;

Fig. 2 is a similar view showing the operating parts of the feeder in alternative positions;

Fig. 3 is a top plan view of the feeder shown in Figs. 1 and 2; and

Fig. 4 is an end elevational view thereof.

Referring more particularly to the various figures of the drawing, my improved fluid distributing feeder comprises a body 1 of any suitable exterior conformation, which may be rectangular. The body 1 is provided with a cylindrical aperture or bore 3 extending axially therethrough. The side wall of the body is pierced by an outlet port 5 near the center and dual-service ports 7 near the ends. The ports are threaded to facilitate connection with pipe lines. At opposite ends of the body 1 are counter-bores 9 of larger diameter which are threaded for receiving hollow threaded plugs or end fixtures 11 therein. Each plug 11 is provided at its closed outer end with a laterally projecting flange 13 comprising a hexagonal head for conveniently receiving a tool for screwing the plug firmly into the body.

For passing fluid freely to the dual-service ports 7 adjacent the ends of the body, the threaded outer surface of the side wall of each plug 11 is provided with a peripheral groove 15 which is connected to the hollow interior of each plug through apertures 17 drilled substantially diametrically therethrough. On annular washer 19 of suitable yieldable material is preferably provided for clamping between the head of each plug and the adjacent end of the body to serve as a gasket for sealing the ends of the feeder.

In the feeder body 1 the cylindrical aperture 3 receives a tubular guide sleeve 21 having a piston guiding orifice therein. The guide sleeve 21 fits snugly in the body and extends into abutting engagement with the inturned ends of the plugs 11 as they are screwed into opposite ends of the body. The side wall of the tubular guide sleeve 21 is pierced by a pair of outlet ports 23 and 25 which are aligned and spaced axially of the sleeve adjacent opposite ends thereof, and which are joined through a slot or channel 27. The slot 27 is not necessarily of precise dimensions or smooth finish and it may therefore be conveniently cut by a milling machine or other suitable means, as will be readily understood.

The guide sleeve 21 is provided with a second pair of ports 31 and 33 which penetrate the side wall in axially spaced relation relatively near the middle of the sleeve, and which may be provided in any circumferential position around the sleeve which will avoid intersecting the slot 27 but which, as shown, are preferably diametrically opposed therefrom. From the second pair of ports 31 and 33 respective grooves 35 and 37 are cut in the outer surface of the guide sleeve 21 to the adjacent ends of the sleeve.

Concentrically disposed within the piston guide sleeve 21 is a hollow tubular piston 39 which slides freely back and forth therein limited only by the abutment of its opposite ends against the heads of the hollow plugs 11.

The slidable hollow piston 39 is provided in its outer surface with an annular groove or port 41 which is cut circumferentially around the middle of the piston. The interior of the hollow piston is connected into the middle grove 41 of the piston through a duct 43.

The slidable tubular piston is also provided in its outer surface with a circumferential groove port 45 spaced axially from the middle of the piston toward the left hand end of the piston to operatively engage the port 31 in the left hand end of the guide sleeve 21. Diametrically opposed ducts 47 connect from this groove port 45 into the interior of the piston. The tubular piston 39 is also provided with a similar external groove port 49 spaced from its middle groove port 41 toward the right hand end of the piston, and connected into the interior of the piston through diametrically opposed apertures 51 in the walls thereof.

The opposite ends of the hollow tubular piston 39 are closed by solid plugs 53 which are pressed or secured therein in any suitable manner. The outermost ends of the piston plugs 53 are spaced a small distance inwardly from the ends of the tubular walls of the piston 39, and the innermost ends of the plugs 53 are terminated in unobstructing relation adjacent the spaced ducts 47 and 51 leading through the piston walls to the external groove ports.

The opposite ends of the side walls of the piston 39 are apertured or notched as at 55 whereby the abutment of either end of the slidable piston against the adjacent body plug 11 will not cut off the admission of fluid pressure to react upon the end of the piston.

An auxiliary piston 57 is slidably disposed in said hollow piston 39 and divides the same into opposed chambers. Spacing stops 59 project from the ends of the auxiliary piston 57 to prevent obstruction of apertures 47 and 51.

The free slidable movement of the tubular piston 39 is determined by the longitudinal dimension of the piston and the distance between the end walls of the hollow plugs 11. The dimensions are so selected that the middle groove port 41 of the piston will open into either one or the other of the ports 31 or 33 spaced near the middle of the guide sleeve 21 as the piston is moved to either one of its two extreme positions. The other piston groove ports 45 and 49 are so spaced on either side of the middle groove 41, that either one or the other respectively engages the port in the guide 21 which is disengaged from the middle piston groove 41 as the piston slides back and forth.

The free sliding distance of the piston is for this purpose preferably equal to the distance between the pair of spaced ports 31 and 33 in the guide sleeve 21, which is equal to the distance between the grooved ports 45, 41 and 49 in the hollow piston 39. The ports 23 and 25 in the guide sleeve are preferably spaced axially a distance which is three times as great as the sliding distance of the tubular piston. The three spaced piston ports thus are adapted to connect with three of the four stationary ports simultaneously, and one of the stationary ports 23 or 25 is disengaged as the piston moves to one end or the other.

In operation, if fluid pressure is applied through the dual-service port 7 at the left hand side, as shown in Fig. 1, the fluid enters the compartment defined by the hollow end fixture 11 at the left hand side, and reacting upon the adjacent end of the slidable piston 39 pushes it to the right, as shown in Fig. 2.

The movement of the hollow piston 39 to the right hand end of its guiding orifice, carries its grooved discharging port 49 into connection with the outlet port 25, and also carries the piston inlet port 45 into connection with stationary port 31 connected through duct 35 with the fluid receiving compartment, while also carrying the by-pass outlet port 41 into discharging connection with stationary port 33.

The fluid then enters the chamber in the hollow piston on the left hand side of the auxiliary piston 57 which is then forced to the right expelling from this space the fluid which was charged therein by a previous operation. When the auxiliary piston 57 completes its stroke to the right, it uncovers the by-pass outlet port 43 and the fluid thereafter entering is by-passed out the other dual-service port 7 and continues around the line after the predetermined quantity of fluid has been thus discharged from the outlet port of the feeder device.

It will be seen that I have provided a fluid feeder device of improved, simplified construction, comprising few working parts which may be readily provided and assembled.

Aside from the specific embodiments of the invention herein clearly shown and described in compliance with the statutes, it will be understood that numerous variations of the construction may be made without departing from the spirit and scope of the invention as disclosed and claimed, and that I do not desire to limit the invention to the exact constructions herein set forth.

I claim:

1. A fluid distributing feeder comprising a body having an aperture therein, a guide sleeve in said aperture, a hollow piston slidable therein, end fixtures on said body for closing the ends of said aperture to define fluid receiving compartments and for determining the stroke of said piston, a service port connected into each compartment, a pair of outlet ports in said hollow piston, a pair of discharge ports spaced in said sleeve for selective connection with said outlet ports as the piston slides between two extreme positions, a by-passing port penetrating the side wall of said piston substantially in the middle, an auxiliary piston slidable in said hollow piston for dividing the same in two opposed chambers selectively connected with said by-passing port in accordance with the position of said auxiliary piston, inlet ports in said hollow piston spaced substantially equally on opposite sides from said by-passing port, a pair of by-pass ports spaced in said guide sleeve for alternative connection with said piston by-passing port and either one of said piston inlet ports selectively in accordance with the position of the hollow piston, a discharge port in said body, and fluid conduit means for interconnecting said discharge ports and for connecting one of the compartments to each one of the other pair of spaced sleeve ports whereby the flow of fluid between the service ports and the body discharge port is controlled through said hollow piston.

2. A fluid distributing feeder comprising a body having an aperture therein, a guide sleeve in said aperture, a hollow piston slidable therein, end fixtures on said body for closing the ends of said aperture to define fluid receiving compartments and for determining the stroke of said piston, a service port connected into each compartment, a pair of outlet ports in said hollow piston, a pair of discharge ports spaced in said sleeve for selective connection with said outlet ports as the piston slides between two extreme positions, a by-passing port penetrating the side wall of said piston substantially in the middle, an auxiliary piston slidable in said hollow piston for dividing the same in two opposed chambers selectively connected with said by-passing port in accordance with the position of said auxiliary piston, inlet ports in said hollow piston spaced substantially equally on opposite sides from said by-passing port, a pair of by-pass ports spaced in said guide sleeve for alternative connection with said piston by-passing port and either one of said piston inlet ports selectively in accordance with the position of the hollow piston, a discharge port in said body, a groove cut in the outer peripheral surface of said guide sleeve for interconnecting the pair of spaced discharge ports in said sleeve with the discharge port in the body, and similar grooves in said guide sleeve for separately connecting each of said by-pass ports in the sleeve with the adjacent compartment at the end thereof.

3. In a fluid distributing feeder the combination as set forth in claim 1 in which: the distance of travel of the hollow piston is substantially equal to the distance between the pair of by-pass ports in the sleeve, the distance between the middle by-passing port in the piston and either of the inlet ports spaced on opposite sides thereof, and in which the distance between the spaced stationary discharge ports is substantially equal to three piston strokes.

DAVID R. HILLIS.